United States Patent [19]
Daniels

[11] Patent Number: 5,662,640
[45] Date of Patent: Sep. 2, 1997

[54] PUPPY TRAINING DIAPER

[76] Inventor: Alan L. Daniels, 1845 Pelkey, Detroit, Mich. 48205

[21] Appl. No.: 584,258

[22] Filed: Jan. 11, 1996

[51] Int. Cl.⁶ ............................................. A61F 13/15
[52] U.S. Cl. ..................... 604/392; 119/856; 54/79.1; 604/385.1
[58] Field of Search .................... 119/854, 856, 119/95; 54/49.1, 78; 604/385.1, 392, 393, 394, 395, 398, 399

[56] References Cited

U.S. PATENT DOCUMENTS

| | | | |
|---|---|---|---|
| 1,772,827 | 8/1930 | Caster-Udell | 54/79.1 |
| 2,283,178 | 5/1942 | Brown | 604/392 |
| 4,577,591 | 3/1986 | Wesseldine | 604/391 |
| 4,917,683 | 4/1990 | Thompson | 604/387 |
| 4,996,949 | 3/1991 | Wunderman et al. | 604/390 |
| 5,005,525 | 4/1991 | Stanton | 604/385.1 |
| 5,234,421 | 8/1993 | Lowman | 604/385.1 |

*Primary Examiner*—John G. Weiss
*Assistant Examiner*—Ki Yong O
*Attorney, Agent, or Firm*—Joseph N. Breaux

[57] ABSTRACT

A puppy training diaper including a reusable harness member and a disposable, absorbent liner member. The harness member includes a stretchable, flexible, impermeable member to which the disposable absorbent liner members are releasable secured with an adhesive.

1 Claim, 1 Drawing Sheet

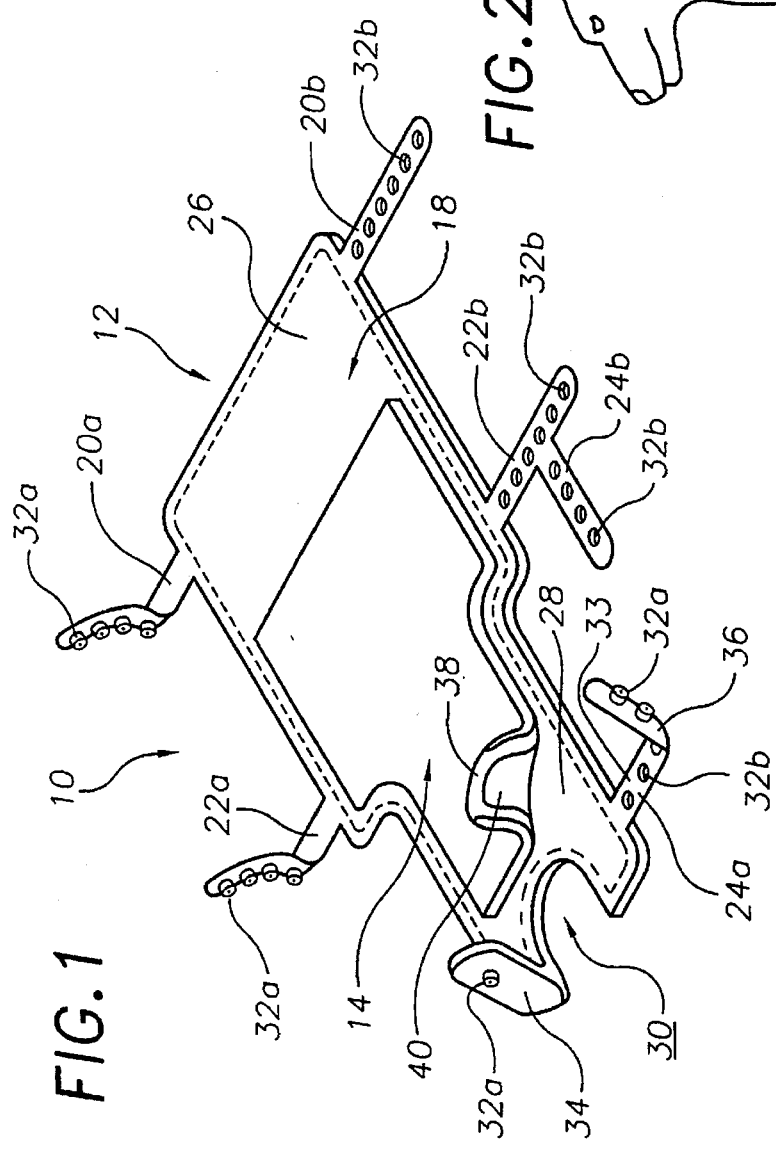
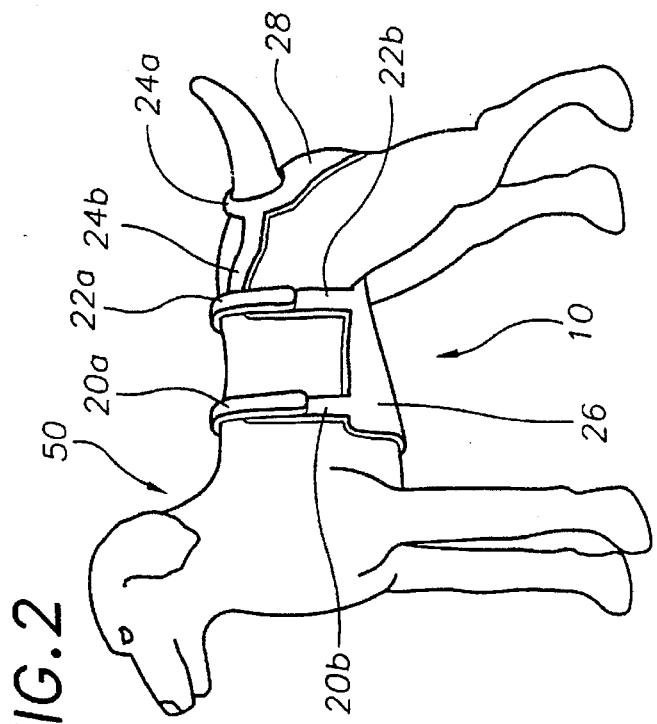
FIG. 1
FIG. 2

PUPPY TRAINING DIAPER

TECHNICAL FIELD

The present invention relates to devices used to aid in house training dogs and more particularly to a training diaper system for puppies including a reusable liquid impermeable outer harness and a disposable absorbent liner member.

BACKGROUND ART

A puppy can cause thousands of dollars in damage to carpets and rugs before becoming fully house trained. This damage takes the form of stains and unpleasant odors from urine and feces. Although house training may take only several weeks, the period in which the puppy is not completely house trained can result in undesirable damage. It would be a benefit, therefore, to have a diaper system that could be worn by the un-house trained puppy until the puppy was completely house trained. It would be a further benefit if the diaper system included a disposable absorbent inner liner for absorbing and holding urine and feces for a period of several hours and an outer liquid impermeable harness that could be reused over and over with new inner liners.

GENERAL SUMMARY DISCUSSION OF INVENTION

It is thus an object of the invention to provide a puppy training diaper that includes an outer harness that is liquid impermeable and that may be used over and over again in combination with disposable, absorbent inner liners that are used once and then discarded.

It is a further object of the invention to provide a puppy training diaper that includes a disposable absorbent inner liner that has a releasable adhesive layer for securing the inner liner in place to an outer harness but that allows the inner liner to be removed from the outer harness without leaving an adhesive residue.

It is a still further object of the invention to provide a puppy training diaper that includes an outer harness that is easily cleaned by spraying with a conventional garden hose and then wiping dry.

It is a still further object of the invention to provide a puppy training diaper that accomplishes all or some of the above objects in combination.

Accordingly, puppy training diaper is provided. The diaper includes a harness member having a flexible, impermeable member including a chest/abdominal portion integrally formed with a genital/rectal portion, a pair of chest straps secured to a forward section of the chest/abdominal portion, a pair of abdomen straps secured to a rearward section of the chest/abdominal portion and a first and second tail straps, the first tail strap being secured to the genital/rectal portion and the second tail strap being secured to one of the abdomen straps, the first tail strap having first fastening means for forming a closed loop with the genital/rectal portion and second fastening means for forming an adjustable connection with the second tail strap; and an absorbent liner member having a liquid absorbing layer and a releasable adhesive layer disposed between the impermeable member and the liquid absorbing layer and removably securing the absorbent layer to the impermeable layer.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a perspective view of an exemplary embodiment of the puppy training diaper of the present invention showing the harness member and the liner member.

FIG. 2 is a side view showing the exemplary diaper of FIG. 1 being worn by a representative dog.

EXAMPLE MODE FOR CARRYING OUT THE INVENTION

FIG. 1 shows an exemplary embodiment of the puppy training diaper of the present invention generally designated by the numeral 10. Diaper 10 includes a harness member, generally designated by the numeral 12 and a liner member generally designated by the numeral 14. Harness member 12 includes a stretchable, flexible, impermeable member, generally designated by the numeral 18; a pair of chest straps 20a, 20b; a pair of abdomen straps 22a, 22b; and a pair of tail straps 24a, 24b. In this embodiment, impermeable member 18; chest straps 20a, 20b; abdomen straps 22a, 22b; and tail straps 24a, 24b are all die cut from a sheet of flexible, stretchable, liquid impermeable vinyl sheeting material having a thickness of about one millimeter.

Impermeable member 18 includes a chest/abdominal portion 26 integrally connected with a smaller dimensioned genital/rectal portion 28. Genital/rectal portion 28 has a tail notch 30 formed therein and into which the tail of the dog is positioned when harness member 12 is strapped in place. Genital/rectal portion 28 has a width sized to just fit between the hind legs of the dog that is selected to wear diaper 10. In this embodiment, genital rectal portion 28 is about four (4") inches wide. Chest/abdominal portion 26 has a width selected to be about two (2") inches greater than the width of genital/rectal portion 28. In this embodiment chest/abdominal portion 26 has a width measuring about six (6") inches.

Chest strap 20a has six male snap halves 32a secured along the length thereof that mateably connect with one or more of six female snap halves 32b secured along the length of chest strap 20b. Abdomen strap 22a also has six male snap halves 32a secured along the length thereof that mateably connect with one or more of six female snap halves 32b secured along the length of abdomen strap 22b. First tail strap 24a has five female snap halves 32b extending from an inward facing side 33 that mateably connect with a male snap half 32a that extends from an exterior portion 34 of genital/rectal portion 28 adjacent tail notch 30; and five male snap halves 32a extending from an outwardly facing side 36 that mateably connect with one or more of the five female snap connectors extending from second tail strap 24b. Second tail strap 24b extends rearwardly from a central point on abdomen strap 24b.

Liner member 14 includes a liquid absorbing layer 38 formed from a sheet of non-woven absorbent textile material and an adhesive layer 40 formed by depositing a releasable adhesive onto one side of liquid absorbing layer 38. Use of a releasable adhesive allows liner member 14 to be securely positioned to impermeable member 18 prior to use but allows for easy removal of a soiled liner member 14 and replacement with a clean one.

Use of diaper 10 is now described with general reference to FIG. 1 and FIG. 2. FIG. 2 shows diaper 10 secured in place on a representative dog 50. Diaper 10 is secured to dog 50 by placing absorbent layer 38 against the inner belly/urinary appendage section of the underside of dog 50. Once absorbent layer 38 is in place, chest straps 20a and 20b are pulled tight and fastened together by snapping a female snap half 32b into engagement with a male snap half 32a. Abdomen straps 22a and 22b are then pulled tight and fastened together in the same manner by snapping a female snap half 32b into engagement with a male snap half 32a. The end portion of genital rectal portion 28 is brought up over the anal opening of dog 50 and the tail placed into tail notch 30. Once the tail is in tail notch 30, first tail strap 24a is wrapped around the tail, tightened and secured to the male snap half 32a that extends from exterior portion 34 of genital/rectal portion 28. After first tail strap 24a is secured around the dogs tail, second tail strap 24b is secured to first tail strap 24a by snapping one of the female snap fastener halves 32b over one of the male snap fastener halves 32a of first tail strap 24a. Removal of diaper 10 is accomplished by reversing the previous steps.

Once diaper 10 is removed, the soiled absorbent liner member 14 is removed and discarded. Harness member 12 is then cleaned by washing in hot soapy water or hosing with a garden hose, dried and fitted with a new, absorbent liner 14 and secured back in place as previously described. It can be seen that when diaper 10 is in place, all urine and feces generated by the dog is trapped with harness member 12 until removal by the dog's trainer. The dog quickly learns not to urinate and/or defecate into the diaper and does so only when the diaper is removed in an outdoor environment.

It can be seen from the preceding description that a puppy training diaper has been provided that includes an outer harness that is liquid impermeable and that may be used over and over again in combination with disposable, absorbent liners that are used once and then discarded; that includes a disposable absorbent liner that has a releasable adhesive layer coating for securing the absorbent liner in place to an outer harness but that allows the absorbent liner to be removed from the outer harness without leaving an adhesive residue; and that includes an outer harness that is easily cleaned by spraying with a conventional garden hose and then wiping dry.

It is noted that the embodiment of the puppy training diaper described herein in detail for exemplary purposes is of course subject to many different variations in structure, design, application and methodology. In particular, although snaps were utilized in the exemplary embodiment, it should be understood that other fastening devices known in the art could be utilized to practice the invention. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A puppy training diaper comprising:

a harness member having a flexible, impermeable member formed from a sheet of flexible, stretchable, liquid impermeable material, said impermeable member including a chest/abdominal portion having a width two inches greater than and integrally formed with a genital/rectal portion, a pair of chest straps integrally formed with and extending from opposed side edges of a forward section of said chest/abdominal portion, a pair of abdomen straps integrally formed with and extending from opposed side edges of a rearward section of said chest/abdominal portion located nearer said genital/rectal portion than said forward section, a tail notch formed into a perimeter edge of said genital/rectal portion sized to receive therein a tail of a dog, a first snap fastener half secured to an exteriorly facing surface of said genital/rectal portion at a location thereon adjacent said tail notch, a first tail strap integrally formed with and extending from said genital/rectal portion, said first tail strap having a plurality of second snap fastener halves extending from an inwardly facing surface thereof and a plurality of third snap fastener halves extending from an outwardly facing surface thereof, said plurality of second snap fastener halves being mateable with said first snap fastener half, and a second tail strap integrally formed with and extending from a central point of one of said pair of abdomen straps, said second tail strap having a plurality of fourth snap fastener halves extending from an inwardly facing surface thereof, said plurality of fourth snap fastener halves being mateable with said third snap fastener halves, said first tail strap forming a closed loop with said genital/rectal portion about said tail notch when said first snap fastener half is mated to one of said plurality of said second fastener halves in a manner to secure a tail of a dog within said tail notch, said plurality of third snap fastener halves being connectable with said plurality of fourth snap fastener halves in a manner such that an adjustable connection between said first and said second tail strap is achieved; and an absorbent liner member having a liquid absorbing layer and a releasable adhesive layer disposed between said impermeable member and said liquid absorbing layer and removably securing said absorbent layer to said impermeable layer.

* * * * *